(12) United States Patent
Lin

(10) Patent No.: US 6,608,616 B2
(45) Date of Patent: Aug. 19, 2003

(54) ERGONOMIC SCROLLING DEVICE

(75) Inventor: Winky Lin, Taipei (TW)

(73) Assignee: Silitek Corporation, Taipei (TW)

( * ) Notice: Subject to any disclaimer, the term of this patent is extended or adjusted under 35 U.S.C. 154(b) by 179 days.

(21) Appl. No.: 09/839,218

(22) Filed: Apr. 23, 2001

(65) Prior Publication Data

US 2002/0154090 A1 Oct. 24, 2002

(51) Int. Cl.[7] ................................................. G09G 5/08
(52) U.S. Cl. ........................................ 345/163; 345/167
(58) Field of Search .................................. 345/156, 163, 345/164, 168, 159, 161, 167, 157

(56) References Cited

U.S. PATENT DOCUMENTS

| | | | |
|---|---|---|---|
| 5,432,530 A | * 7/1995 | Arita et al. ................ | 345/159 |
| 5,724,068 A | * 3/1998 | Sanchez et al. ............ | 345/161 |
| 6,256,011 B1 | * 7/2001 | Culver ....................... | 345/157 |
| 6,489,950 B1 | * 12/2002 | Griffin et al. .............. | 345/168 |

* cited by examiner

*Primary Examiner*—Steven Saras
*Assistant Examiner*—Uchendu O. Anyaso
(74) *Attorney, Agent, or Firm*—Rabin & Berdo, P.C.

(57) ABSTRACT

An ergonomic scrolling device comprises a shell and a rolling wheel. The rolling wheel is pivotally connected to the shell. The shell has an axial shaft perpendicular to the axis of the rolling wheel and on an external surface of the shell. The shell is rotatable around the axial shaft such that the shell can be rotated leftward or rightward. The rolling wheel is also rotated with the shell to a specific angle for providing more convenience to user.

4 Claims, 6 Drawing Sheets

ERGONOMIC SCROLLING DEVICE

FIELD OF THE INVENTION

The present invention relates to an ergonomic scrolling device, especially to an ergonomic scrolling device applicable to a mouse or keyboard.

BACKGROUND OF THE INVENTION

The prior art mouse generally adopts a scroll wheel to achieve third axis input. The scroll wheel is linked to an encoder wheel to provide three-dimensional input and a scrolling function in 2D Windows applications. FIG. 1 shows a prior art mouse with a scroll or scrolling wheel. As shown in this figure, the mouse 1a has a shell 10a suitable for handholding and a scrolling wheel 11a on the front side of the shell 10a. The axis of the scrolling wheel 11a is pivotally connected to pivotal means (not shown) within the shell and the top portion the scrolling wheel 11a partially exposes out of the upper surface of the shell 10a to facilitate user's operation.

However, in above-mentioned mouse with a scrolling wheel, the scrolling wheel is vertical to the table on which the mouse rests. As shown in FIG. 2, a user holds the mouse with the scrolling wheel by hand to operate the mouse. When the user want to press or rotate the scrolling wheel, he/she needs to adjust the gesture of his/her finger 20a or wrist 2a to operate the scrolling wheel. The finger 20a or wrist 2a of the user are often contorted in an uneasy position, and therefore, pain or discomfort may be caused by the uneasy position.

SUMMARY OF THE INVENTION

It is an object of the present invention to provide an ergonomic scrolling device to reduce the strain on a person's finger and wrist during operation.

It is another object of the present invention to provide an ergonomic scrolling device such that user can rotate the scrolling device to a specific angle for more comfortable operation.

To achieve the above objects, the present invention provides an ergonomic scrolling device comprising a shell and a rolling wheel. The rolling wheel is pivotally connected to the shell. The shell has an axial shaft perpendicular to the axis of the rolling wheel and on external surface of the shell. The axial shaft of the shell is pivotally connected to an input means. The shell has a through hole on top surface thereof and top portion of the rolling wheel exposing out of the through hole of the shell. The shell is rotatable around the axial shaft such that the shell can be rotated leftward or rightward. The rolling wheel is also rotated as the axial shaft as pivot to a specific angle for providing more convenience to user.

The various objects and advantages of the present invention will be more readily understood from the following detailed description when read in conjunction with the appended drawing, in which:

DESCRIPTION OF THE INVENTION

Figure 1:
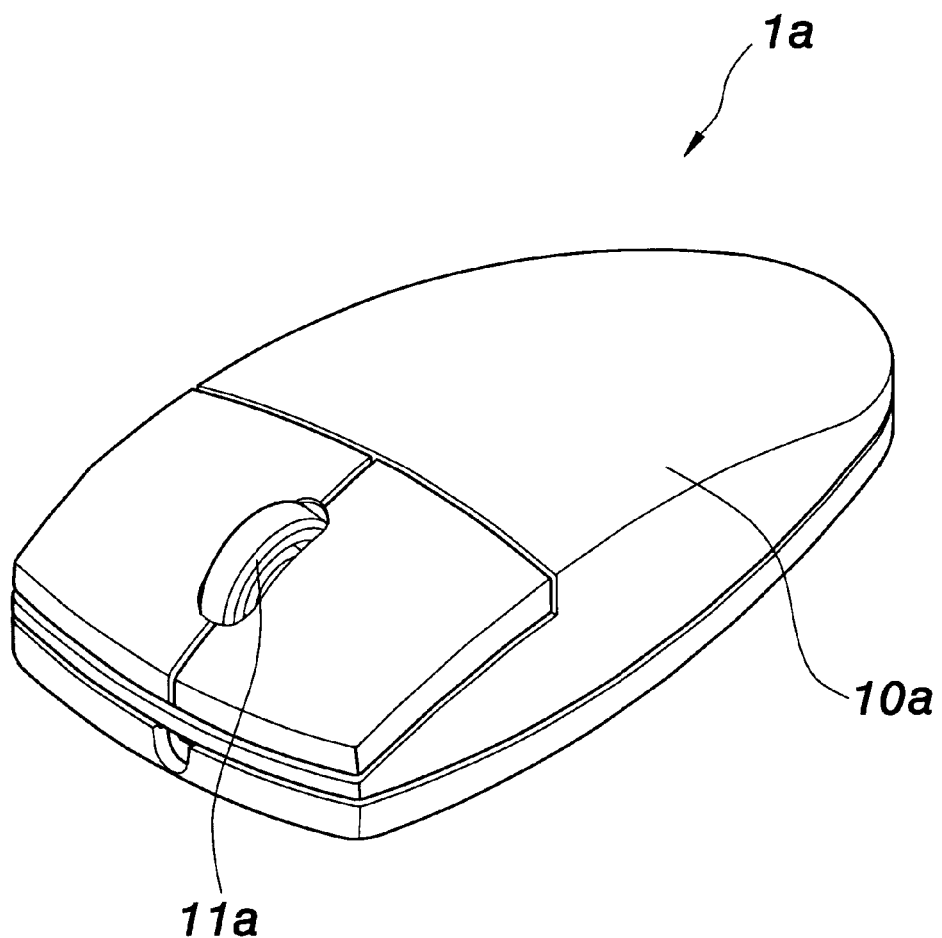
FIG. 1 shows the perspective view of a prior art mouse with scrolling wheel.
Figure 2:
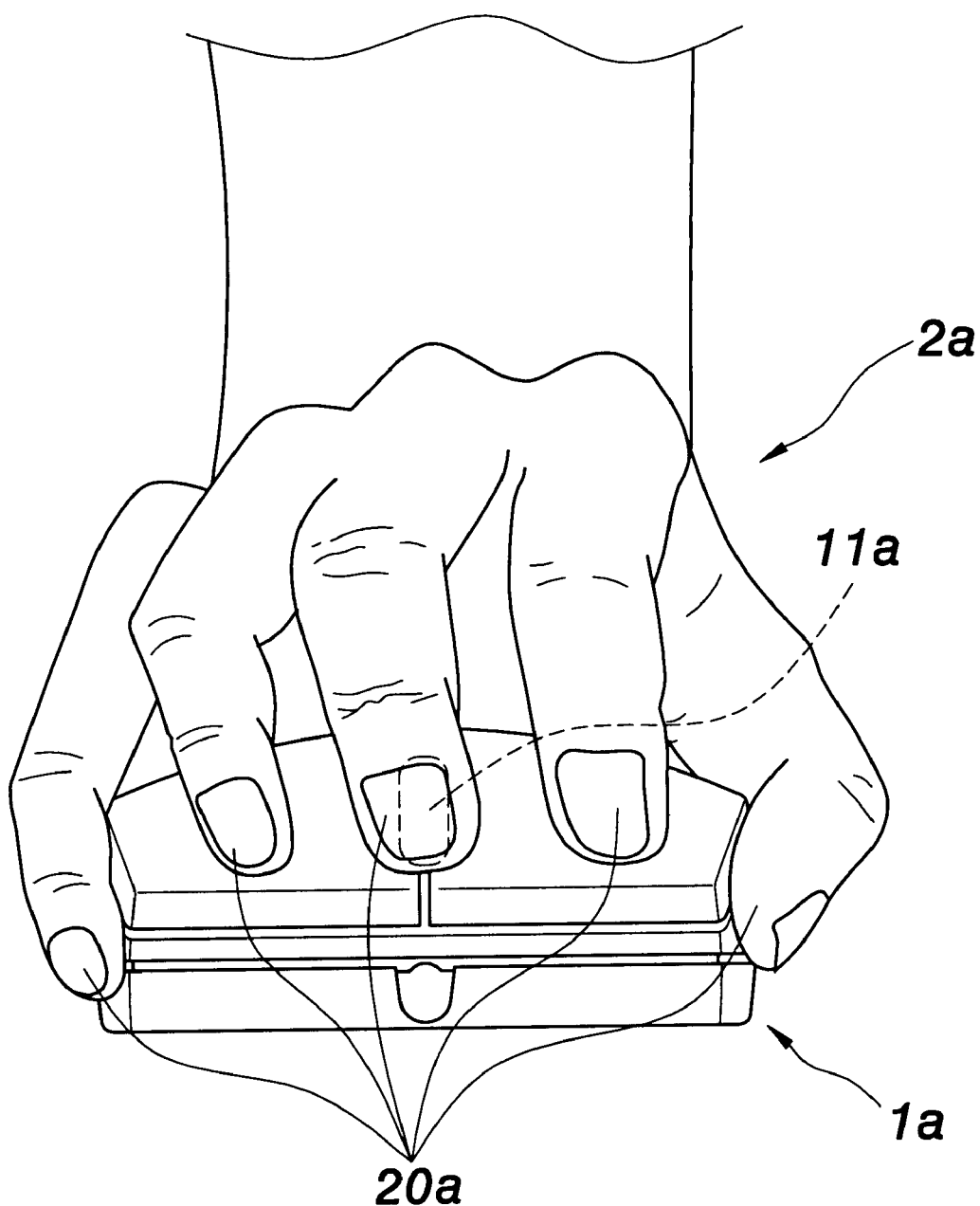
FIG. 2 shows a schematic view of user's hand holding a mouse in a natural state.
Figure 3:
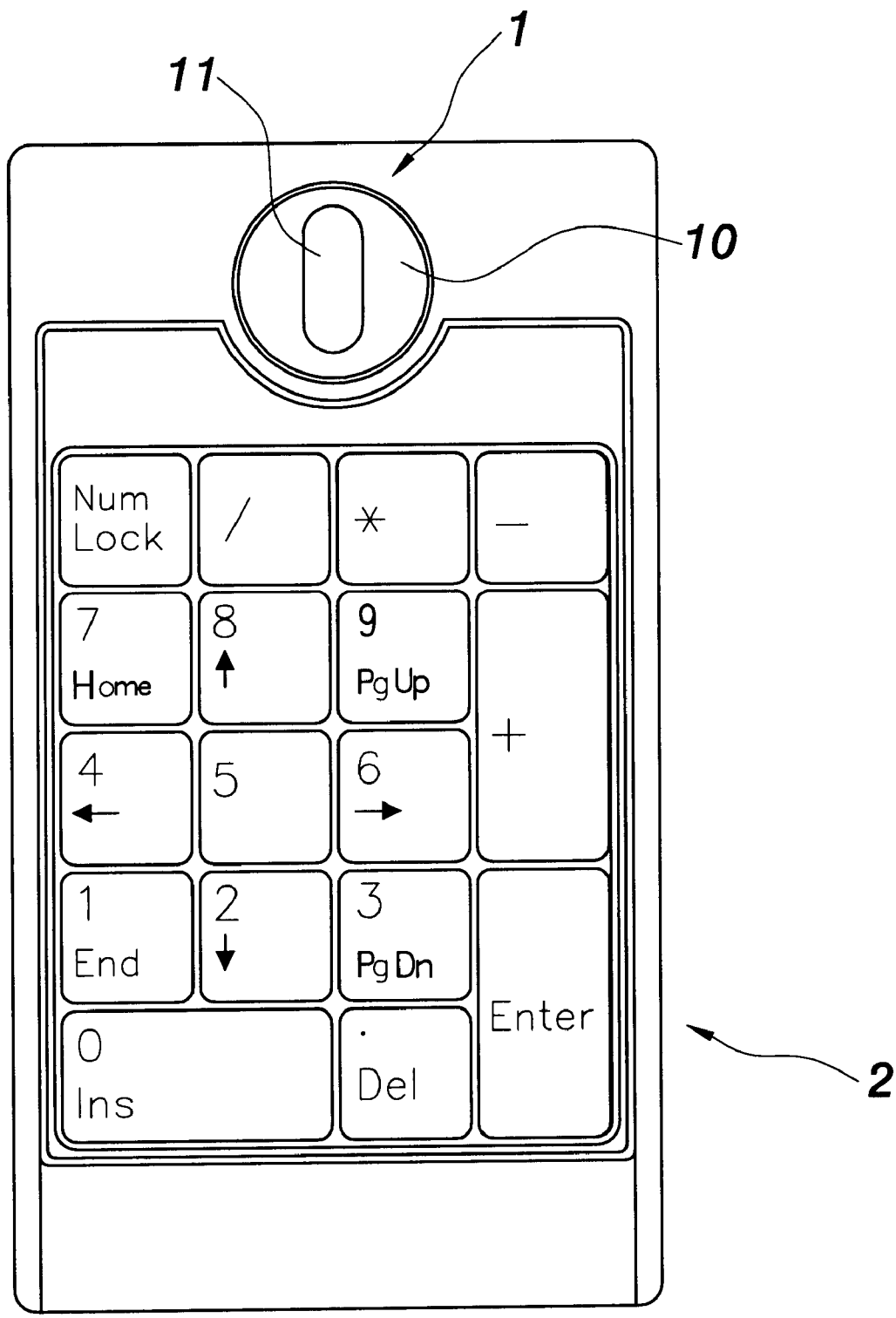
FIG. 3 shows the top view of the preferred embodiment of the present invention.
Figure 4:
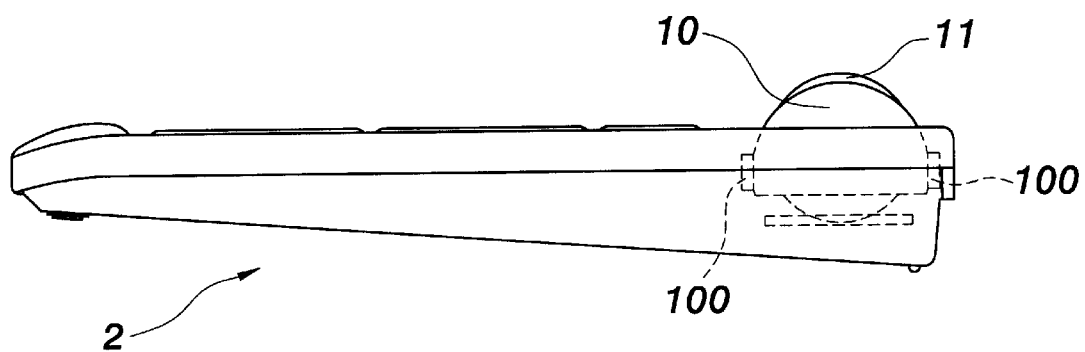
FIG. 4 shows the side view of the preferred embodiment of the present invention.
Figure 5:
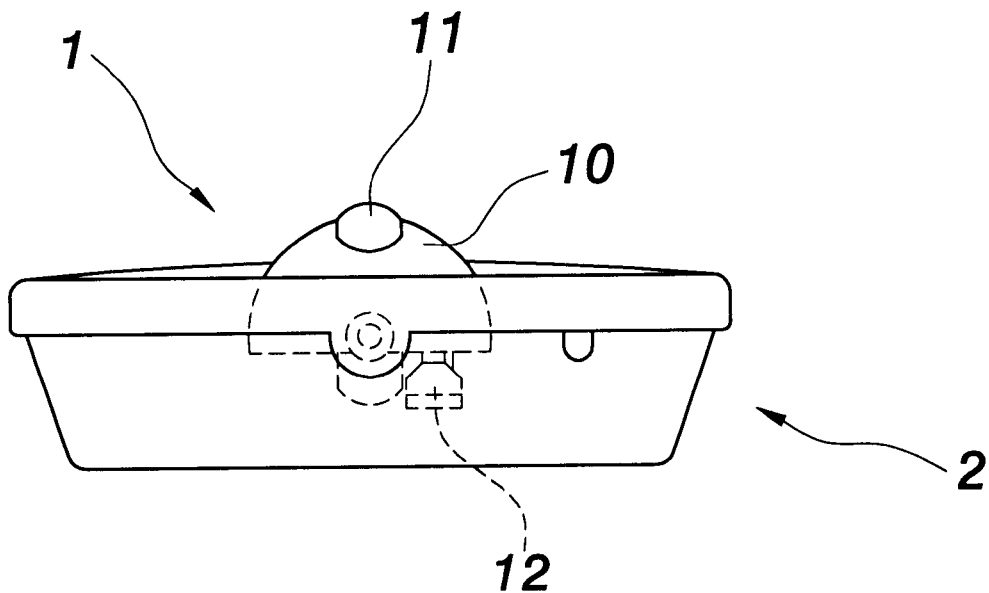
FIG. 5 shows the front view of the preferred embodiment of the present invention.

FIGS. 3, 4 and 5 show the top view, side view and front view of the preferred embodiment of the present invention, respectively. In the present invention, a scrolling device 1 is arranged adjacent a keyboard 2 of an input apparatus. The input apparatus can be, for example, a mouse, touch pad, digital pad, remote controller, joystick, notebook computer, personal digital assistant (PDA) or mobile phone. The scrolling device 1 is composed of a shell 10 and a rolling wheel 11.

The shell 10 can be of semi-sphere shape or semi-cylinder shape and has an axial shaft 100 extending from both ends thereof. The axial shaft 100 is pivotally connected to the case or shell of the input apparatus. The shell 10 has a through hole (not shown) through which the top portion of the rolling wheel 11 protrudes out of the shell 10, whereby the user can conveniently press or rotate the rolling wheel 11.

The rolling wheel 11 has an axial bar (not shown) perpendicular to the axial shaft 100 of the shell 10. The axial bar of the rolling wheel 11 is pivotally connected to the inner side of the shell 10 such that the rolling wheel 11 can be rotated with the axial bar as pivot. Moreover, the rolling wheel 11 is provided with an encoder 12. The encoder 12 generates coding signal corresponding to rotation of the rolling wheel 11 when the rolling wheel 11 is rotated by hand. Moreover, the scrolling device 1 has an angle-fixing unit (not shown), which can fix the shell 10 to a specific angle with respect to the keyboard 2.

Figure 6:
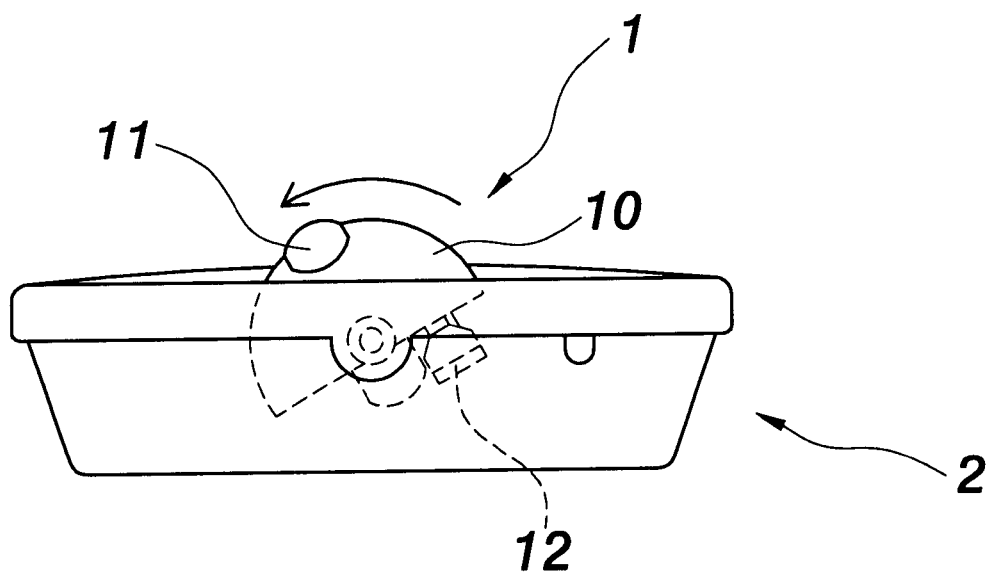
FIG. 6 is a view showing the operation of the scrolling device of the present invention.
Figure 7:
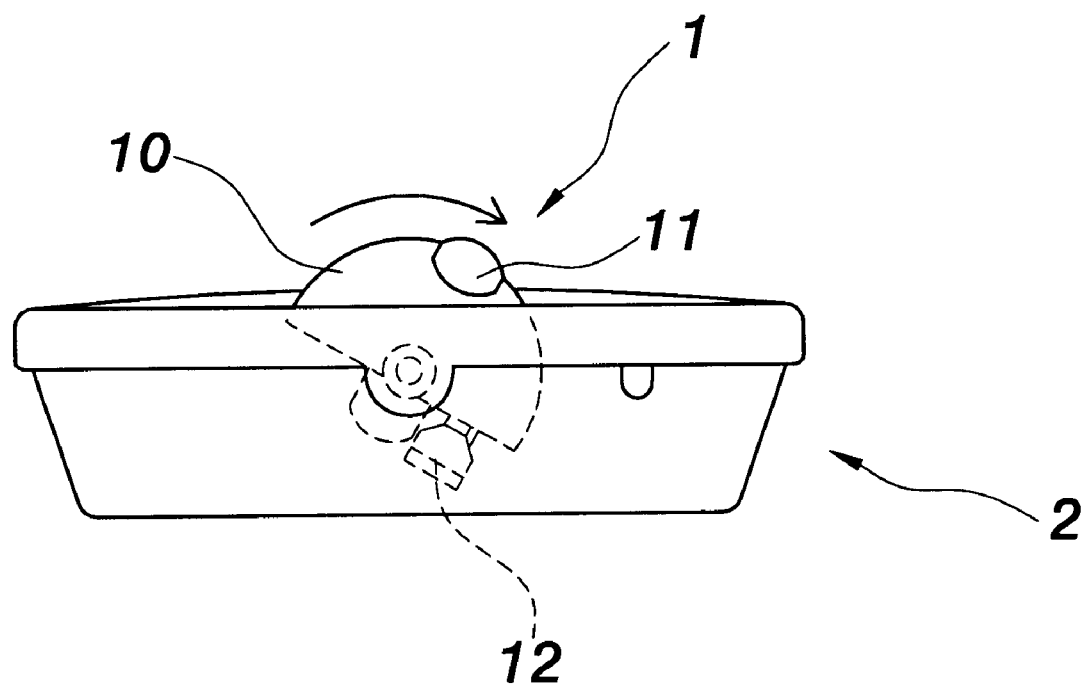
FIG. 7 is another view showing the operation of the scrolling device of the present invention.

With reference now to FIGS. 6 and 7, the operation of the scrolling device is demonstrated. At first, the user (either left-handed user or right-handed user) adjusts the scrolling device 1 to a specific angle with respect to the keyboard 2 such that the user feels comfortable to use the scrolling device 1. In other word, the rolling wheel 11 is rotated leftward or rightward (0°–90°) with the shell 10. Therefore, a mouse or keyboard with the scrolling device 1 is more ergonomic to the user.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

I claim:

1. An ergonomic scrolling device for use with an input means having a case, comprising
    a shell of semi-sphere shape or semi-cylinder shape, and having a through hole on a top side thereof;
    means for mounting the shell on the case for rotation about a first axis;
    a rolling wheel having an axial bar pivotably connected to the shell to mount the rolling wheel for rotation about a second axis that is transverse to the first axis, the rolling wheel protruding out of the through hole of the shell; and
    an encoder coupled to the rolling wheel.

2. The ergonomic scrolling device as in claim 1, wherein the input means is selected from the group consisting of a mouse, a keyboard, a touch pad, a digital pad, a remote controller, a joystick, a notebook, a personal digital assistant (PDA) and a mobile phone.

3. An ergonomic scrolling device adapted for an input means with a receiving portion, comprising:
- a shell having a substantially semi-sphere or semi-cylinder shape, the shell having two opposing ends respectively defining two stubby shafts that are pivotally received in two opposing holes of the receiving portion of the input means, the shell being pivotable leftward or rightward about an axis defined by the stubby shafts, the shell having a through hole;
- a rolling wheel rotatably mounted on the shell, a portion of the rolling wheel protruding out of the shell through the through hole in the shell; and
- an encoder carried by the shell and coupled to the rolling wheel.

4. The ergonomic scrolling device as in claim 3, wherein the input means is selected from the group consisting of a mouse, a keyboard, a touch pad, a digital pad, a remote controller, a joystick, a notebook, a personal digital assistant (PDA) and a mobile phone.

* * * * *